US011126642B2

(12) United States Patent
Rastogi et al.

(10) Patent No.: US 11,126,642 B2
(45) Date of Patent: Sep. 21, 2021

(54) SYSTEM AND METHOD FOR GENERATING SYNTHETIC DATA FOR MINORITY CLASSES IN A LARGE DATASET

(71) Applicant: HCL Technologies Limited, Uttar Pradesh (IN)

(72) Inventors: Avnish Kumar Rastogi, Uttar Pradesh (IN); Nitin Narang, Sunnyvale, CA (US); Mohammad Ajmal, Uttar Pradesh (IN)

( * ) Notice: Subject to any disclaimer, the term of this patent is extended or adjusted under 35 U.S.C. 154(b) by 164 days.

(21) Appl. No.: 16/525,215

(22) Filed: Jul. 29, 2019

(65) Prior Publication Data

US 2021/0034645 A1 Feb. 4, 2021

(51) Int. Cl.
*G06F 17/00* (2019.01)
*G06F 16/28* (2019.01)
*G06F 16/22* (2019.01)

(52) U.S. Cl.
CPC ........ *G06F 16/285* (2019.01); *G06F 16/2246* (2019.01)

(58) Field of Classification Search
CPC ............................ G06F 16/285; G06F 16/2246
See application file for complete search history.

(56) References Cited

U.S. PATENT DOCUMENTS

| | | | |
|---|---|---|---|
| 7,539,657 B1 | 5/2009 | Liu et al. | |
| 10,013,507 B2 | 7/2018 | Zhang et al. | |
| 2009/0097741 A1* | 4/2009 | Xu | G06T 7/0012 382/159 |
| 2014/0334304 A1* | 11/2014 | Zang | H04L 47/2441 370/235 |
| 2017/0032276 A1* | 2/2017 | Sukhanov | G06F 16/41 |
| 2017/0372222 A1* | 12/2017 | Kollia | G06N 20/00 |
| 2018/0107729 A1* | 4/2018 | Vyas | G06N 20/00 |

FOREIGN PATENT DOCUMENTS

| | | |
|---|---|---|
| CN | 101976435 | 2/2011 |
| CN | 104573708 | 4/2015 |
| WO | 200711542 | 10/2007 |

OTHER PUBLICATIONS

Y. Yue, Y. Li, K. Yi and Z. Wu, "Synthetic Data Approach for Classification and Regression," 2018 IEEE 29th International Conference on Application-specific Systems, Architectures and Processors (ASAP), Milan, Italy, pp. 1-8, doi: 10.1109/ASAP.2018.8445094, July (Year: 2018).*

* cited by examiner

*Primary Examiner* — Greta L Robinson
(74) *Attorney, Agent, or Firm* — Kendal Sheets

(57) ABSTRACT

Disclosed method for generating synthetic data for minority classes in a very large dataset comprises grouping samples stored on several devices, into different groups. A pivot is identified to be used as a reference for grouping the samples into bins. The samples are assigned to a bin, based on a closest pivot. The samples are regrouped into different groups, based on identities of the bins, and each of the groups is distributed to the several devices. Samples belonging to majority class and minority classes for which synthetic data is not being generated are removed from each of the different groups. Samples of each of these groups are arranged in different M-Trees to facilitate identification of K-nearest neighbours for each sample within each of the different groups to generate K pairs of nearest neighbours. Finally, synthetic samples are generated for the K pairs of nearest neighbours by creating random samples.

15 Claims, 3 Drawing Sheets

SYSTEM AND METHOD FOR GENERATING SYNTHETIC DATA FOR MINORITY CLASSES IN A LARGE DATASET

TECHNICAL FIELD

The present subject matter described herein, in general, relates to processing of dataset for classification of data.

BACKGROUND

Most real-world prediction (classification) scenarios include problems where the data of interest belongs to categories which are in minority, such as predicting intrusion attacks over the network. In such case, the number of attacks attempted on a network may be present in minority in the dataset that may be used to train a classification model to predict network attacks. These network attacks are of different types like probe attacks, denial of service attacks, r2l attacks, u2r attacks etc. Developing a system to correctly predict a correct category of network attack involves addressing the primary problem that the number of attacks is in minority compared to actual network data with the number of samples of individual attacks being further less. Predicting both an attack as well as nature of attack accurately is very critical to a network's safety. Similarly, another real-world example can be to predict manufacturing defects in an equipment assembly line e.g. manufacturing car, computers etc. The manufacturing defects can be present in different stages of a manufacturing assembly line for example in part assembly, alignment, etc. Predicting nature and category of defects is important to estimate manpower requirements, supplier selection as well as timelines for production delivery. Finding category of defects is tricky as the number of defective equipments is very less compared to the actual number of equipment manufactured, getting further aggravated as instances of individual defects e.g. user error, defective parts etc. are further less. However, an accurate prediction of a defective equipment and nature of defect can help an organization in saving significant costs in managing sales and delivery timelines of equipment computers.

In most of the cases, such as in both the cases mentioned above, samples of interest i.e. one or more minority classes are far less in number than overall dataset. At times, samples of interest may not be present at all. This type of dataset is called an imbalanced dataset. The cost of not predicting accurately is very high and hence there is a need to accurately predict the minority categories. An imbalance in the dataset is represented by a mismatch in class representation. Due to imbalanced nature of data, all supervised learning classification techniques on this imbalanced data gets biased in favour of the majority class, this further degrades in accuracy as data dimensionality increases. Training a model on such a dataset results in ignorance of the minority data classes.

Synthetic Minority Oversampling Technique (SMOTE) is one conventional technique that vastly improves prediction in imbalance datasets by generating synthetic minority samples. Existing SMOTE implementations are inept to handle multi-class datasets as well as very large data sizes. Thus, there remains a need to address the problem of generating synthetic data for minority classes in a very large and highly imbalanced dataset.

SUMMARY

Before the present systems and methods for generating synthetic data for minority classes in a large dataset are described, it is to be understood that this application is not limited to the particular systems, or methodologies described, as there can be multiple possible embodiments which are not expressly illustrated in the present disclosures. It is also to be understood that the terminology used in the description is for the purpose of describing the particular implementations or versions or embodiments only, and is not intended to limit the scope of the present application.

This summary is provided to introduce aspects related to a system and a method for generating synthetic data for minority classes in a large dataset. This summary is not intended to identify essential features of the claimed subject matter nor is it intended for use in determining or limiting the scope of the claimed subject matter.

In one implementation, a system for generating synthetic data for minority classes in a large dataset is disclosed. In one aspect, the system comprises a memory and a processor coupled to the memory. Further, the processor may be capable of executing instructions in the memory to perform one or more steps. In the aspect, the processor may group samples stored on a plurality of devices, into different groups, based on relative distance of each sample. The processor may further identify at least one pivot to be used as a reference for grouping the samples into a plurality of bins. The processor may further assign the samples to at least one bin of the plurality of bins, based on a Euclidean distance defining a closest pivot. The processor may further regroup the samples into different groups, based on identities of the bins. Further, each of the groups may be distributed to the plurality of devices. The processor may further remove from each of the different groups, samples belonging to majority class and all minority classes for which synthetic data is not being generated. The processor may further identify K-nearest neighbours for each sample within each of the different groups to generate K pairs of nearest neighbours. The processor may arrange the samples in an M-Tree to efficiently identify K pairs of nearest neighbours. A nearest neighbour for a sample may be identified within a same class to which the sample belongs. Similar samples may be identified to generate the K pairs of nearest neighbours based on Euclidean Distances in an M-dimensional space. The processor may further generate synthetic samples for the K pairs of nearest neighbours by creating random samples. Each random sample may lie between two samples belonging to a pair of the K pairs of nearest neighbours.

In one implementation, a method for generating synthetic data for minority classes in a large dataset is disclosed. In one aspect, the method may comprise grouping samples stored on a plurality of devices, into different groups, based on relative distance of each sample. The method may further comprise identifying at least one pivot to be used as a reference for grouping the samples into a plurality of bins. The method may further comprise assigning the samples to at least one bin of the plurality of bins, based on a Euclidean distance defining a closest pivot. The method may further comprise regrouping the samples into different groups, based on identities of the bins. Further, each of the groups may be distributed to the plurality of devices. The method may further comprise removing, from each of the different groups, samples belonging to majority class and all minority classes for which synthetic data is not being generated. The method may further comprise identifying K-nearest neighbours for each sample within each of the different groups to generate K pairs of nearest neighbours. The method may involve arranging the samples in an M-Tree to efficiently identify K pairs of nearest neighbours. A nearest neighbour for a sample may be identified within a same class to which the sample belongs. Similar samples may be identified to generate the K pairs of nearest neighbours based on Euclidean Distances in an M-dimensional space. The method may further comprise generating synthetic samples for the K pairs of nearest neighbours by creating random samples. Each random sample may lie between two samples belonging to a pair of the K pairs of nearest neighbours.

In yet another implementation, non-transitory computer readable medium embodying a program executable in a computing device for generating synthetic data for minority classes in a large dataset is disclosed. In one aspect, the program may comprise a program code for grouping samples stored on a plurality of devices, into different groups, based on relative distance of each sample. The program may further comprise a program code for identifying at least one pivot to be used as a reference for grouping the samples into a plurality of bins. The program may further comprise a program code for assigning the samples to at least one bin of the plurality of bins, based on a Euclidean distance defining a closest pivot. The program may further comprise a program code for regrouping the samples into different groups, based on identities of the bins. Further, each of the groups may be distributed to the plurality of devices. The program may further comprise a program code for removing, from each of the different groups, samples belonging to majority class and all the minority classes for which synthetic data is not being generated. The program may further comprise a program code for identifying K-nearest neighbours for each sample within each of the different groups to generate K pairs of nearest neighbours. The program may arrange the samples in an M-Tree to efficiently identify K pairs of nearest neighbours. A nearest neighbour for a sample may be identified within a same class to which the sample belongs. Similar samples may be identified to generate the K pairs of nearest neighbours based on Euclidean Distances in an M-dimensional space. The program may further comprise a program code for generating synthetic samples for the K pairs of nearest neighbours by creating random samples. Each random sample may lie between two samples belonging to a pair of the K pairs of nearest neighbours.

BRIEF DESCRIPTION OF THE DRAWINGS

The foregoing detailed description of embodiments is better understood when read in conjunction with the appended drawings. For the purpose of illustrating of the present subject matter, an example of construction of the present subject matter is provided as figures; however, the invention is not limited to the specific method and system disclosed in the document and the figures.

The present subject matter is described in detail with reference to the accompanying figures. In the figures, the left-most digit(s) of a reference number identifies the figure in which the reference number first appears. The same numbers are used throughout the drawings to refer various features of the present subject matter.

DETAILED DESCRIPTION

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any systems and methods for generating synthetic data for minority classes in a large dataset, similar or equivalent to those described herein can be used in the practice or testing of embodiments of the present disclosure, the exemplary, systems and methods for generating synthetic data for minority classes in a large dataset are now described. The disclosed embodiments for generating synthetic data for minority classes in a large dataset are merely examples of the disclosure, which may be embodied in various forms.

Various modifications to the embodiment will be readily apparent to those skilled in the art and the generic principles herein may be applied to other embodiments for generating synthetic data for minority classes in a large dataset. However, one of ordinary skill in the art will readily recognize that the present disclosure for generating synthetic data for minority classes in a large dataset is not intended to be limited to the embodiments described, but is to be accorded the widest scope consistent with the principles and features described herein.

Figure 1:
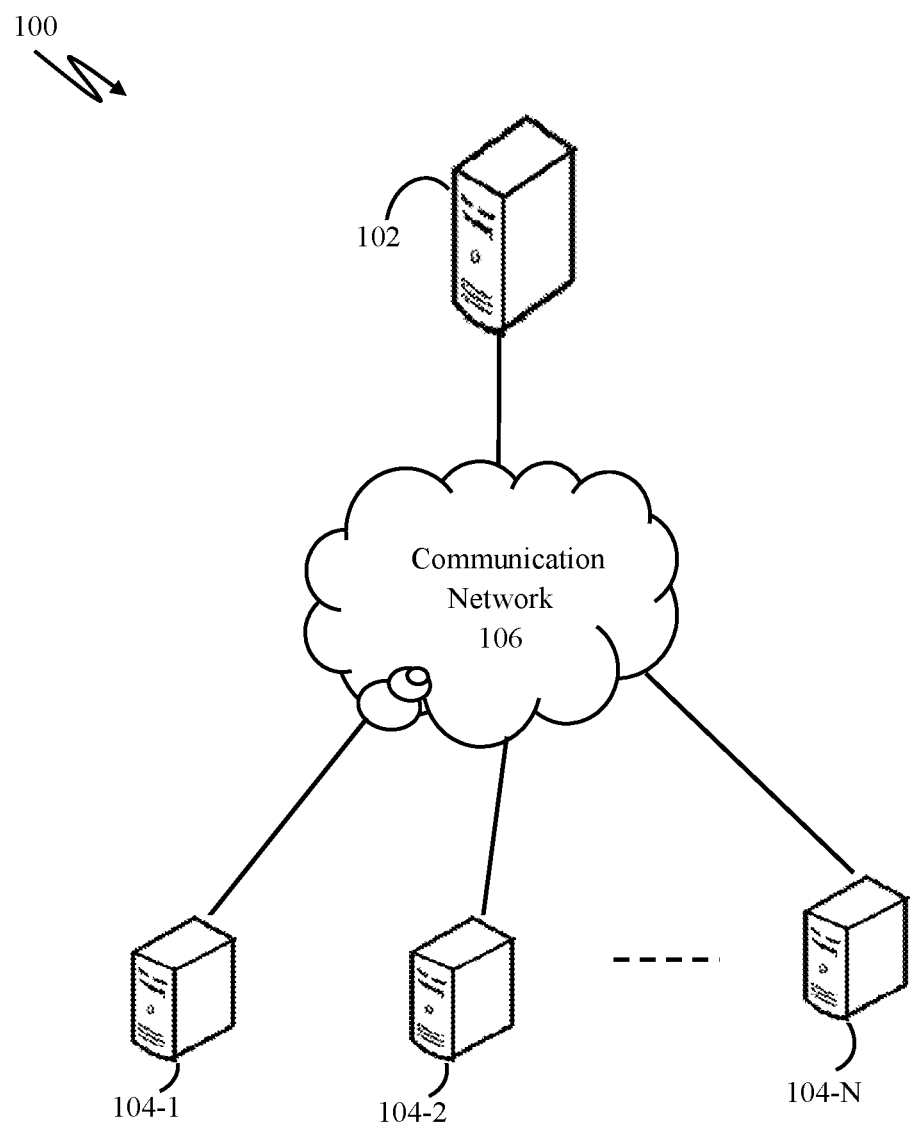
FIG. 1 illustrates a network architecture diagram 100 of a system 102 to generate synthetic data for minority classes in a large dataset, in accordance with an embodiment of the present subject matter.

Referring now to FIG. 1, a network implementation diagram 100 of a system 102 for generating synthetic data for minority classes in a large dataset, in accordance with an embodiment of the present subject matter may be described. In one example, the system 102 may be connected with several other computing devices 104-1 through 104-N (collectively referred as devices 104) through a communication network 106. Such connection of the system 102 and the devices 104 may be known as a cluster of machines. Further, the system 102 may be one of the devices 104 or another device having computing capability higher than the devices 104.

It should be understood that the system 102 and the devices 104 are different computing devices used by different users. It may be understood that the system 102 and the devices 104 may also be implemented in a variety of computing systems, such as a laptop computer, a desktop computer, a notebook, a workstation, a mainframe computer, a server, a network server, a cloud-based computing environment, or a mobile and the like.

In one implementation, the communication network 106 may be a wireless network, a wired network, or a combination thereof. The communication network 106 can be implemented as one of the different types of networks, such as intranet, Local Area Network (LAN), Wireless Personal Area Network (WPAN), Wireless Local Area Network (WLAN), wide area network (WAN), the internet, and the like. The communication network 104 may either be a dedicated network or a shared network. The shared network represents an association of the different types of networks that use a variety of protocols, for example, MQ Telemetry Transport (MQTT), Extensible Messaging and Presence Protocol (XMPP), Hypertext Transfer Protocol (HTTP), Transmission Control Protocol/Internet Protocol (TCP/IP), Wireless Application Protocol (WAP), and the like, to communicate with one another. Further, the communication network 106 may include a variety of network devices, including routers, bridges, servers, computing devices, storage devices, and the like.

Figure 2:
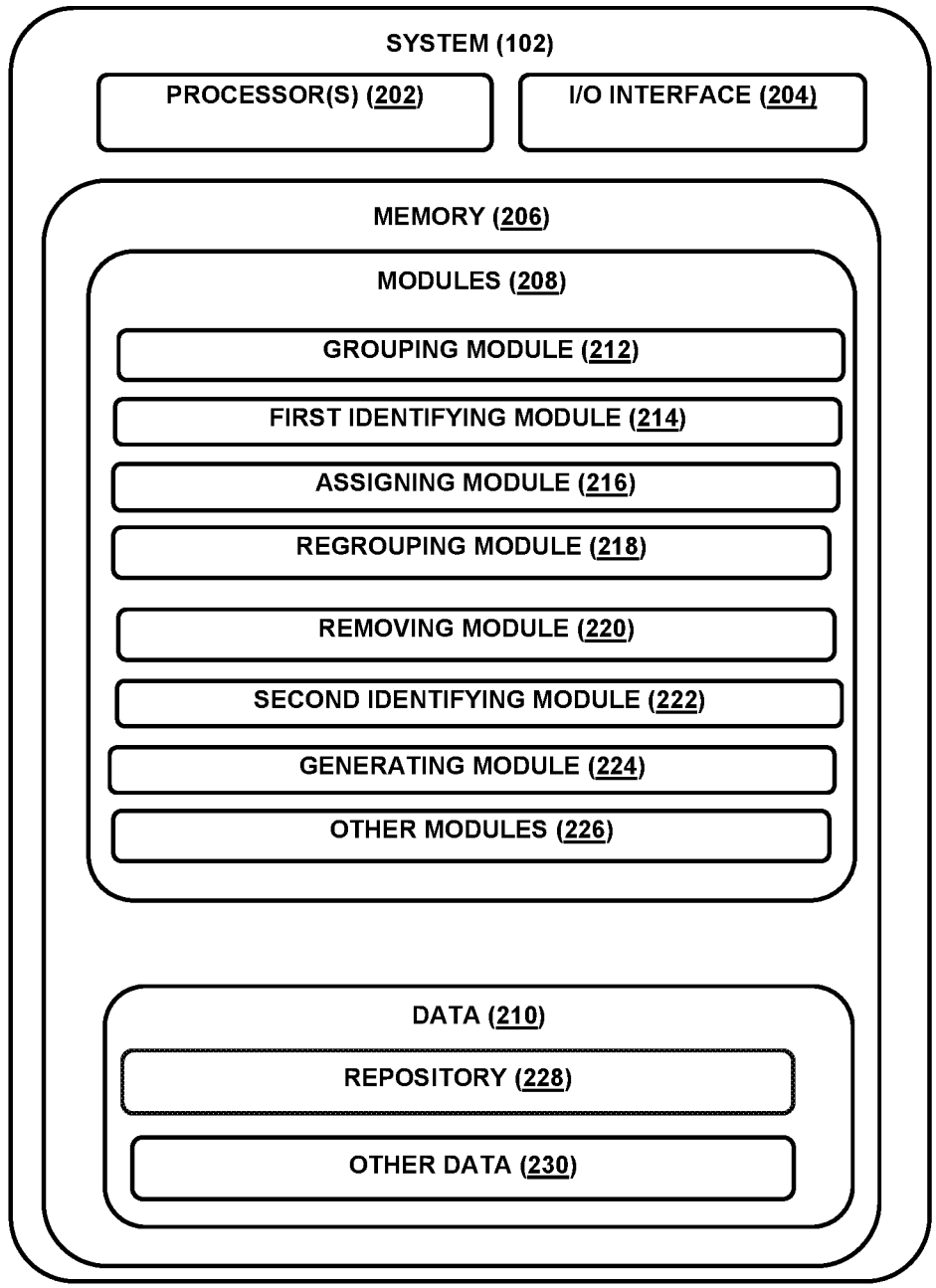
FIG. 2 illustrates a block level diagram of the system 102, in accordance with an embodiment of the present subject matter.

Referring now to FIG. 2, a block diagram 200 of the system 102 is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 may be configured to fetch and execute computer-readable instructions stored in the memory 206.

The I/O interface 204 may include a variety of software and hardware interfaces, for example, a web interface, a graphical user interface, and the like. The I/O interface 204 may allow a user to interact with the system 102. Further, the I/O interface 204 may enable the system 102 to communicate with the devices 104, and other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206, amongst other things, serves as a repository for storing data processed, received, and generated by one or more of modules 208. The memory 206 may include any computer-readable medium or computer program product known in the art including, for example, volatile memory, such as Static Random Access Memory (SRAM) and Dynamic Random Access Memory (DRAM), and/or non-volatile memory, such as Read Only Memory (ROM), Erasable Programmable ROM (EPROM), Electrically Erasable and Programmable ROM (EEPROM), flash memories, hard disks, optical disks, and magnetic tapes.

The memory 206 may include data generated as a result of the execution of one or more of the modules 208. In one implementation, the memory 206 may include data 210. The modules 208 include routines, programs, objects, components, data structures, etc., which perform particular tasks or implement particular abstract data types. In one implementation, the modules 208 may include a grouping module 212, first identifying module 214, assigning module 216, regrouping module 218, removing module 220, second identifying module 222, generating module 224, and other modules 226. The other modules 226 may include programs or coded instructions that supplement applications and functions of the system 102. The modules 208 described herein may be implemented as software modules that may be executed in the cloud-based computing environment of the system 102.

The data 210 may include a repository 228 for storing data processed, computed, received, and generated by one or more of the modules 208. Furthermore, the data 210 may include other data 230 for storing data generated as a result of the execution of one or more modules in the other modules 226.

The embodiments described henceforth are meant to describe a method for generating synthetic data for multiple minority classes on very large imbalanced and distributed dataset. The very large imbalanced and distributed dataset may be a multi-class dataset including data samples corresponding to either a majority data class or one or more minority data classes. The majority data class is data represented by most of the data samples present in the dataset. The one or more minority data classes indicate other data represented by relatively small number of samples. The data samples may be huge in number and may be stored on a cloud network, memories of the devices 104, or the memory 206 of the system 102 or disk of the system 102.

The below described embodiments are particularly intended to solve the problem that remains while there is a need to predict against multiple minority classes and synthetic data needs to be generated for training a model against the minority classes as the minority classes are present in the order of 1% of entire data set. A factor/ratio by which the minority classes have to be up sampled as an input, are utilized in the embodiments. Multiple minority classes could be grouped together for generating synthetic data in the successive embodiments.

At first, samples stored on the devices 104 may be grouped into a number of different groups by the grouping module 212. The number of groups may vary from one dataset to another depending on a number of the devices 104 forming the cluster of machines and also the storage capacity and memory attached to each of these devices. In one case, the samples may be grouped based on relative distance of each sample. The relative distance of each sample may be identified by Euclidean distance. 'M' samples i.e. pivots may be identified by the first identifying module 214. The pivots may be identified using any known distributed clustering technique, such as scalable k-means++ clustering. Upon identification, the 'M' samples i.e. the pivots may be used as a reference for grouping the samples into 'M' bins.

The samples may be assigned to a bin of the 'M' bins, by the assigning module 216, based on a Euclidean distance defining a closest pivot. The samples may be regrouped into different groups, by the regrouping module 218, based on identities of the bins. Further, each of the groups may be distributed to the plurality of devices. Samples belonging to majority class and/or one or more minority class (es) for which synthetic data is not being generated may be removed from each of the different groups by the removing module 220. In case the user wishes to club multiple classes together, a new class identity may be assigned to samples belonging to the minority class, based on the user's instruction to group one or more minority classes together for up sampling.

Post filtering the classes from the groups, samples close to one another may be identified by the second identifying module 222. Samples may be arranged in an M-Tree to optimize the identification of samples close to one another. K-nearest neighbours may be identified for each sample within each of the different groups to generate K pairs of nearest neighbours. Any known technique or algorithm may be utilized for generating the K pairs of nearest neighbours. A nearest neighbour for a sample may be identified within a same class to which the sample belongs. Similar samples may be identified to generate the K pairs of nearest neighbours based on Euclidean Distances in an M-dimensional space.

Each of the devices 104 may take samples of the groups assigned to them. For each sample, synthetic samples for the K pairs of nearest neighbours may be generated by creating random samples by the generating module 224. Each random sample may lie between two samples belonging to a pair of the K pairs of nearest neighbours. A number (C) of the synthetic samples generated may be determined as:

$$C=[(\text{Majority Count})/(\text{Count of minority classes to be up sampled})]*(\text{up sampling ratio}/2*k).$$

In above equation, the up sampling ratio may range from 0 to 1 and value of 'k' may be 5, in one case. Further, a different value of 'k' may be used in other cases.

The embodiments described above enable generation of minority up sampled data for datasets of very large sizes including data of multiple classes/categories. All the samples belonging to all the minority classes for which synthetic data needs to be generated are utilized and data is generated in a single iteration. Therefore, such way of processing the data in a single iteration requires very less memory and computing power compared to the existing techniques, and is therefore extremely efficient and cost effective. The above described embodiments have practical utilization in classifying data of interest present in minority in large datasets. A fine application of the above embodiments could include training a classification model to predict network attacks.

Figure 3:
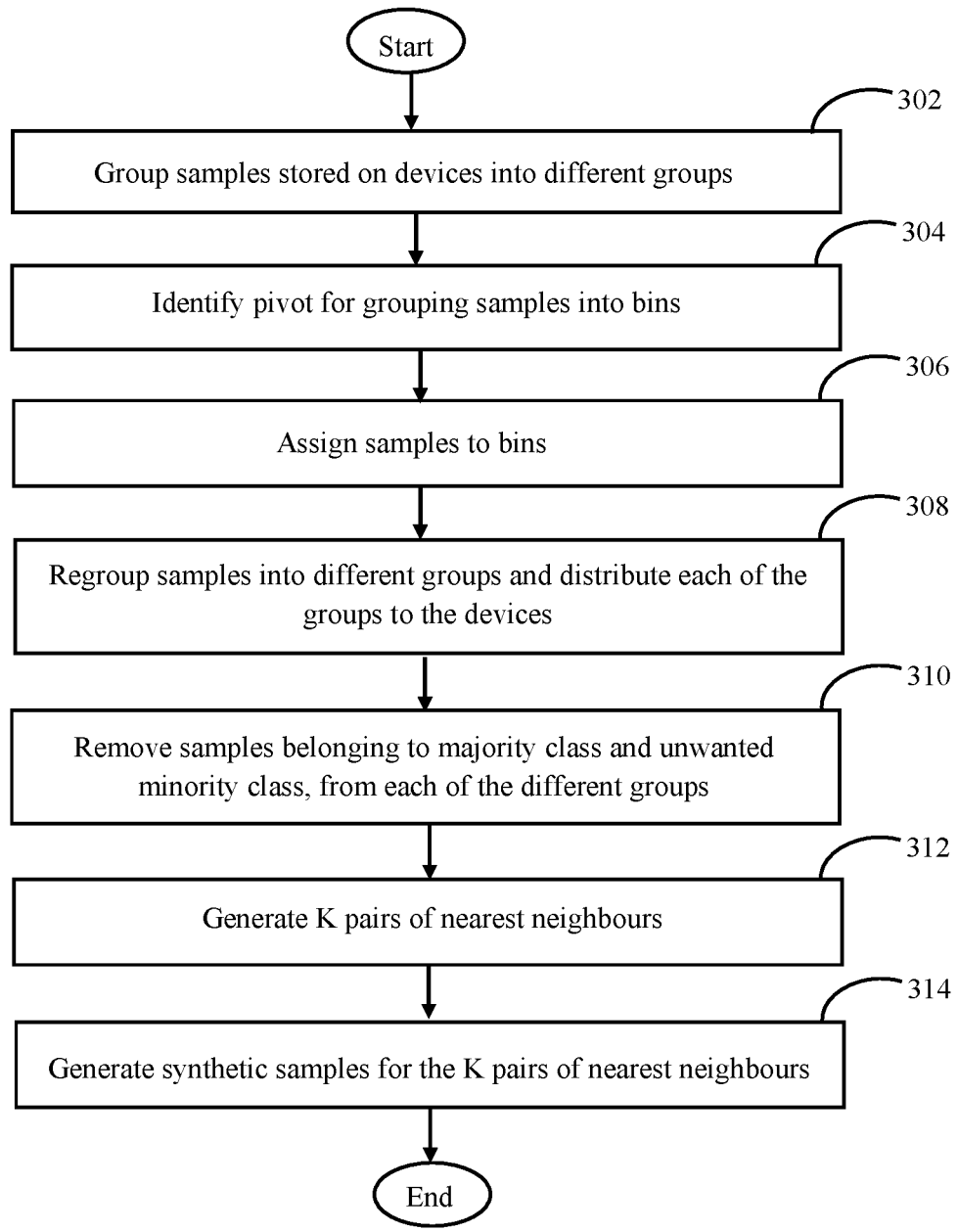
FIG. 3 illustrates a method 300 for generating synthetic data for minority classes in a large dataset, in accordance with an embodiment of the present subject matter.

Referring now to FIG. 3, a method 300 for generating synthetic data for minority classes in a large dataset is described, in accordance with an embodiment of the present subject matter. The method 300 may be described in the general context of computer executable instructions. Generally, computer executable instructions can include routines, programs, objects, components, data structures, procedures, modules, functions, etc., that perform particular functions or implement particular abstract data types.

The order in which the method 300 for generating synthetic data for minority classes in a large dataset is described is not intended to be construed as a limitation, and any number of the described method blocks can be combined in any order to implement the method 300 or alternate methods. Additionally, individual blocks may be deleted from the method 300 without departing from the spirit and scope of the subject matter described herein. Furthermore, the method can be implemented in any suitable hardware, software, firmware, or combination thereof. However, for ease of explanation, in the embodiments described below, the method 300 may be considered to be implemented in the above described system 102.

At block 302, samples stored on a plurality of devices may be grouped into different groups. In one case, the samples may be grouped based on relative distance of each sample.

At block 304, at least one pivot to be used as a reference for grouping the samples into a plurality of bins may be identified.

At block 306, the samples may be assigned to at least one bin of the plurality of bins, based on a Euclidean distance defining a closest pivot.

At block 308, the samples may be regrouped into different groups, based on identities of the bins. Further, each of the groups may be distributed to the plurality of devices.

At block 310, samples belonging to majority class and/or minority class for which synthetic data is not being generated may be removed from each of the different groups.

At block 312, samples may be arranged in a tree like M-Tree so that K-nearest neighbours may be easily identified for each sample within each of the different groups to generate K pairs of nearest neighbours. A nearest neighbour for a sample may be identified within a same class to which the sample belongs. Similar samples may be identified to generate the K pairs of nearest neighbours based on Euclidean Distances in an M-dimensional space.

At block 314, synthetic samples may be generated for the K pairs of nearest neighbours by creating random samples. Each random sample may lie between two samples belonging to a pair of the K pairs of nearest neighbours.

Although implementations for methods and systems for generating synthetic data for minority classes in a large dataset have been described in language specific to structural features and/or methods, it is to be understood that the appended claims are not necessarily limited to the specific features or methods described. Rather, the specific features and methods are disclosed as examples of implementations for generating synthetic data for minority classes in a large dataset.

What is claimed is:

1. A method for generating synthetic data for minority classes in a very large dataset, the method comprising:
    grouping, by a processor, samples stored on a plurality of devices, into different groups, based on relative distance of each sample;
    identifying, by the processor, at least one pivot to be used as a reference for grouping the samples into a plurality of bins;
    assigning, by the processor, the samples to at least one bin of the plurality of bins, based on a Euclidean distance defining a closest pivot;
    regrouping, by the processor, the samples from the at least one bin of the plurality of bins into different groups, and distributing each of the groups to the plurality of devices;
    removing, by the processor, from each of the different groups, samples belonging to at least one of majority class and minority class for which synthetic data is not being generated;
    arranging, by the processor, each sample of each of the groups into an M-Tree;
    identifying, by the processor, K—nearest neighbours for each sample within each of the different groups to generate K pairs of nearest neighbours, wherein a nearest neighbour for a sample is identified within a same class to which the sample belongs, and wherein similar samples are identified to generate the K pairs of nearest neighbours based on Euclidean Distances in an M-dimensional space; and
    generating, by the processor, synthetic samples for the K pairs of nearest neighbours by creating random samples, wherein each random sample lies between two samples belonging to a pair of the K pairs of nearest neighbours.

2. The method as claimed in claim 1, wherein the dataset is imbalanced and distributed.

3. The method as claimed in claim 1, wherein the at least one pivot is identified using distributed clustering techniques like scalable k-means++ clustering.

4. The method as claimed in claim 1, further comprising assigning a new class identity to samples belonging to the majority class and the minority class, based on a user instruction to group one or more minority classes together for up sampling.

5. The method as claimed in claim 1, wherein a number of the synthetic samples generated is determined as:

$$C=[(\text{Majority Count})/(\text{Count of minority classes to be up sampled})]*(\text{up sampling ratio}/2*k).$$

6. The method as claimed in claim 5, wherein the up sampling ratio ranges from 0 to 1.

7. The method as claimed in claim 5, wherein value of nearest neighbour pairs generated for each sample, 'k' is 5.

8. A system for generating synthetic data for minority classes in a large dataset, the system comprising:
a plurality of devices connected to form a cluster of devices, wherein at least one device of the plurality of devices comprise
a memory; and
a processor coupled to the memory, wherein the processor is capable of executing instructions to:
group samples stored on a plurality of devices, into different groups, based on relative distance of each sample;
identify at least one pivot to be used as a reference for grouping the samples into a plurality of bins;
assign the samples to at least one bin of the plurality of bins based on a Euclidean distance defining a closest pivot;
regroup the samples from the at least one bin of the plurality of bins into different groups, and distribute each of the groups to the plurality of devices;
remove, from each of the different groups, samples belonging to at least one of majority class and minority class for which synthetic data is not being generated;
arrange the samples of each of these groups into different M-Trees;
identify K—nearest neighbours for each sample within each of the different groups to generate K pairs of nearest neighbours, wherein a nearest neighbour for a sample is identified within a same class to which the sample belongs, and wherein similar samples are identified to generate the K pairs of nearest neighbours based on Euclidean Distances in an M-dimensional space; and
generate synthetic samples for the K pairs of nearest neighbours by creating random samples, wherein each random sample lies between two samples belonging to a pair of the K pairs of nearest neighbours.

9. The system as claimed in claim 8, wherein the dataset is imbalanced and distributed.

10. The system as claimed in claim 8, wherein the at least one pivot is identified using clustering techniques comprising k-means clustering, k-means projective clustering, and k-means++ clustering.

11. The system as claimed in claim 8, further comprising assigning a new class identity to samples belonging to the majority class and the minority class, based on a user instruction to group one or more minority classes together for up sampling.

12. The system as claimed in claim 8, wherein a number of the synthetic samples generated is determined as:

$$C=[(\text{Majority Count})/(\text{Count of minority classes to be up sampled})]*(\text{up sampling ratio}/2*k).$$

13. The system as claimed in claim 12, wherein the up sampling ratio ranges from 0 to 1.

14. The system as claimed in claim 12, wherein value of nearest neighbour pairs generated for each sample 'k' is 5.

15. A non-transitory computer program product having embodied thereon a computer program for generating synthetic data for minority classes In a large dataset, the computer program product storing instructions for:
grouping samples stored on a plurality of devices, into different groups, based on relative distance of each sample;
identifying at least one pivot to be used as a reference for grouping the samples into a plurality of bins;
assigning the samples to at least one bin of the plurality of bins, based on a Euclidean distance defining a closest pivot;
regrouping the samples from the at least one bin of the plurality of bins into different groups, and distributing each of the groups to the plurality of devices;
removing, from each of the different groups, samples belonging to at least one of majority class and minority class for which synthetic data is not being generated;
grouping the samples in each of these different groups into different M-Trees;
identifying K—nearest neighbours for each sample within each of the different groups to generate K pairs of nearest neighbours, wherein a nearest neighbour for a sample is identified within a same class to which the sample belongs, and wherein similar samples are identified to generate the K pairs of nearest neighbours based on Euclidean Distances in an M-dimensional space; and
generating synthetic samples for the K pairs of nearest neighbours by creating random samples, wherein each random sample lies between two samples belonging to a pair of the K pairs of nearest neighbours.

* * * * *